US012637184B1

(12) United States Patent
Lin

(10) Patent No.: US 12,637,184 B1
(45) Date of Patent: May 26, 2026

(54) FLOATING BODY APPARATUS AND SYSTEM

(71) Applicant: Quilo Technology (Jiaxing) Co., Ltd., Jiaxing City (CN)

(72) Inventor: Pengfei Lin, Jiaxing City (CN)

(73) Assignee: QUILO TECHNOLOGY (JIAXING) CO., LTD., Jiaxing City (CN)

( * ) Notice: Subject to any disclaimer, the term of this patent is extended or adjusted under 35 U.S.C. 154(b) by 0 days.

(21) Appl. No.: 19/037,909

(22) Filed: Jan. 27, 2025

(30) Foreign Application Priority Data

Dec. 31, 2024 (CN) .......................... 202423322012.4

(51) Int. Cl.
| | |
|---|---|
| *B63B 35/00* | (2020.01) |
| *B63B 43/18* | (2006.01) |
| *G05D 1/622* | (2024.01) |
| *G05D 107/00* | (2024.01) |
| *G05D 109/30* | (2024.01) |
| *G05D 111/10* | (2024.01) |
| *G05D 111/20* | (2024.01) |

(52) U.S. Cl.
CPC .............. B63B 43/18 (2013.01); B63B 35/00 (2013.01); G05D 1/622 (2024.01); *B63B 2035/007* (2013.01); *G05D 2107/29* (2024.01); *G05D 2109/34* (2024.01); *G05D 2111/10* (2024.01); *G05D 2111/20* (2024.01)

(58) Field of Classification Search
CPC ... B63B 2035/007; B63B 35/00; B63B 43/18; G05D 1/622; G05D 2107/29; G05D 2109/34; G05D 2111/10; G05D 2111/20
See application file for complete search history.

(56) References Cited

U.S. PATENT DOCUMENTS

| | | | | |
|---|---|---|---|---|
| 7,037,038 B1* | 5/2006 | Haski | ...................... | B60L 53/38 405/60 |
| 12,221,196 B1* | 2/2025 | Liu | ........................... | B63G 8/24 |
| 2014/0263087 A1* | 9/2014 | Renaud | ................. | E04H 4/1654 210/745 |
| 2014/0273541 A1* | 9/2014 | Renaud | ................. | E04H 4/1672 439/13 |
| 2018/0044936 A1* | 2/2018 | Torem | ................... | E04H 4/1654 |

(Continued)

FOREIGN PATENT DOCUMENTS

| | | |
|---|---|---|
| DE | 10 2007 038 559 A1 | 2/2009 |
| DE | 20 2023 000 414 U1 | 4/2023 |
| WO | 2017/129863 A1 | 8/2017 |

OTHER PUBLICATIONS

German Search Report dated Jan. 12, 2026 received in German Application No. 202025100119.5.

*Primary Examiner* — Matthew J. Reda
(74) *Attorney, Agent, or Firm* — Scully, Scott, Murphy & Presser, P.C.

(57) ABSTRACT

A floating body apparatus and a floating body system are provided. The apparatus includes a floating body and a detection sensor. The detection sensor for detects information of an obstacle around the floating body, the detection sensor is arranged at a bottom or a side surface of the floating body, so as to be lower than a water surface, a vertical distance H between the detection sensor and the water surface satisfies 0<H≤13 cm, and when a pipe line exists on the water surface at a front end of a movement direction of the floating body, the floating body performs an avoidance action to avoid the pipe line.

20 Claims, 5 Drawing Sheets

Pool wall

Pipe line

(56) References Cited

U.S. PATENT DOCUMENTS

| | | | | |
|---|---|---|---|---|
| 2018/0052246 A1* | 2/2018 | Hartland | .............. | G01V 1/3808 |
| 2018/0073266 A1* | 3/2018 | Goldenberg | ............. | G05D 1/10 |
| 2022/0010573 A1* | 1/2022 | Torem | ................... | E04H 4/1654 |
| 2022/0332402 A1* | 10/2022 | Gibson | ................. | B63H 21/17 |
| 2025/0276769 A1* | 9/2025 | Inoue | ..................... | G05D 1/243 |

* cited by examiner

Pool wall

Hose line

FLOATING BODY APPARATUS AND SYSTEM

CROSS-REFERENCE TO RELATED APPLICATION(S)

The disclosure claims the priority to Chinese Patent Application No. 202423322012.4, filed with the China National Intellectual Property Administration (CNIPA) on Dec. 31, 2024, which is hereby incorporated by reference in its entirety.

FIELD

The disclosure relates to the technical field of water operations, and in particular to a floating body apparatus and system.

BACKGROUND

With wide application of water operation apparatuses and unmanned surface vessel, floating body apparatuses play an important role in fields such as water cleaning, environmental monitoring, water surveying and mapping, and search and rescue. This type of apparatuses generally float at a water surface depending on its floating force, and implements navigation and function execution by sensing a surrounding environment. However, in a complex water environment, a floating body apparatus floating on a water surface faces numerous challenges, and especially has an obvious shortcoming in terms of avoidance of obstacles including a water-surface hose line.

A conventional water-surface floating body apparatus is usually equipped with an ultrasonic sensor, a laser radar sensor, or a visual detection sensor for sensing a water-surface obstacle and a surrounding environment. However, most of these detection sensors detect an obstacle on the water surface and above the water surface, and cannot effectively detect an obstacle on a water surface and below the water surface. Due to such detection blindness, the floating body apparatus is likely to get entangled with the hose line and unlikely to be extricated during operation. This not only causes failure in functions of the apparatus, but also causes possible damage to the apparatus, and seriously affects the working efficiency and the reliability of the apparatus.

SUMMARY

An objective of the utility model is to solve the above technical problem, and provide a floating body apparatus and system, such that a detection sensor of the floating body apparatus efficiently detects an obstacle such as a hose line on a water surface, and a problem that the floating body apparatus sticks is avoided. In order to achieve the objective, technical solutions of the utility model are as follows:

A floating body apparatus includes a floating body and a detection sensor. The detection sensor is used for detecting information of an obstacle around the floating body. The detection sensor is arranged at a bottom or a side surface of the floating body, so as to be lower than a water surface. A vertical distance H between the detection sensor and the water surface satisfies $0 < H \leq 13$ cm. When a hose line exists on the water surface at a front end of a moving direction of the floating body, the floating body performs an avoidance action to avoid the hose line.

Specifically, the detection sensor is one of or a combination of several of an ultrasonic detection sensor, an underwater LiDAR detection sensor, and an infrared detection sensor.

Specifically, when the hose line exists on the water surface at the front end of the movement direction of the floating body, the avoidance action performed by the floating body includes at least one of or any combination of moving backwards, turning left, or turning right.

Specifically, when at least part of the hose line gets entangled with the floating body, the floating body performs extrication action to get separated from the hose line.

Specifically, when at least part of the hose line gets entangled with a right front corner of the floating body, and a distance between a left side of the floating body and an obstacle is less than a first threshold, the floating body moves backwards until no part of the floating body makes contact with the hose line.

Specifically, when at least part of the hose line gets entangled with a right front corner of the floating body, and a distance between a left side of the floating body and an obstacle is not less than a first threshold, the floating body turns left until no part of the floating body makes contact with the hose line.

Specifically, when at least part of the hose line gets entangled with a left front corner of the floating body, and a distance between a left side of the floating body and an obstacle is less than a second threshold, the floating body moves backwards until no part of the floating body makes contact with the hose line.

Specifically, when at least part of the hose line gets entangled with a left front corner of the floating body, and a distance between a left side of the floating body and an obstacle is not less than a second threshold, the floating body turns right until no part of the floating body makes contact with the hose line.

Specifically, the floating body apparatus further includes a power system, where the power system includes a left propeller and a right propeller, and both the left propeller and the right propeller are mounted at a rear of the floating body;

when the extrication action performed by the floating body is moving backwards, both the left propeller and the right propeller are controlled to rotate reversely, such that the floating body performs action of moving backwards;

when the extrication action performed by the floating body is turning left, a rotational speed of the left propeller is controlled to be less than that of the right propeller, such that the floating body performs action of turning left; and when the extrication action performed by the floating body is turning right, the rotational speed of the left propeller is controlled to be greater than that of the right propeller, such that the floating body performs action of turning right.

A floating body system includes a detection unit, a power system, a control unit, and the floating body of the floating body apparatus, where the detection unit is used for detecting information of an obstacle around the floating body, and the control unit controls, according to the information of an obstacle, the power system to perform avoidance action or extrication action.

Compared with the prior art, the floating body apparatus and system of the utility model have the advantages that:

the vertical distance between the detection sensor and the water surface is determined, such that the detection sensor has high detection efficiency, and further, the floating body apparatus can avoid an obstacle such as a hose line in time and avoid sticking in the obstacle.

Figures 1, 2:
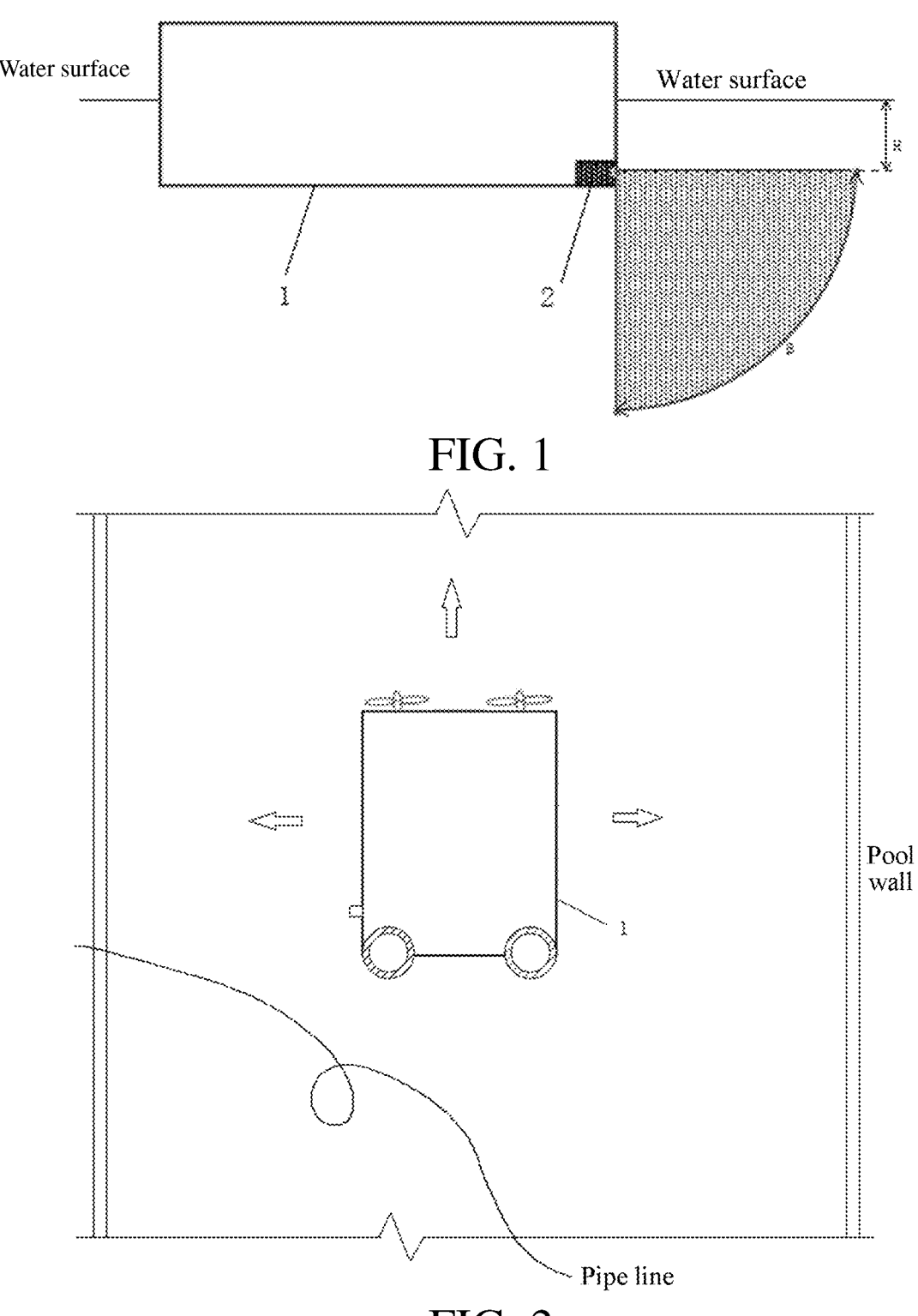
FIG. 1 is a schematic structural diagram of a floating body apparatus according to an embodiment of the disclosure.
FIG. 2 is a schematic diagram of avoiding a hose line by a floating body apparatus in a pool according to an embodiment of the disclosure.

REFERENCE NUMERALS floating body 1, and detection sensor 2.

DESCRIPTION OF EMBODIMENTS

In order to make the technical solutions and advantages of the disclosure clearer, illustrative embodiments of the disclosure will be further described in detail below with reference to the accompanying drawings. Apparently, the embodiments described are merely some embodiments rather than exhaustive embodiments. It should be noted that the embodiments in the disclosure and features in the embodiments can be combined without conflicts.

With reference to FIG. 1, FIG. 1 is a schematic diagram of a floating body apparatus according to the disclosure. The floating body apparatus includes a floating body 1. A detection unit and a power system are arranged on the floating body 1. A control unit for controlling movement of the power system is connected to the power system. The power system implements actions of moving forwards, moving backwards, turning left, turning right, etc. of the floating body 1.

In an embodiment, the detection unit includes a detection sensor 2. The detection sensor 2 is used for detecting an obstacle. The detection sensor 2 may be one of or a combination of several of an ultrasonic detection sensor, an underwater LiDAR detection sensor, and an infrared detection sensor. A working environment of the floating body apparatus may be a water area. When the floating body apparatus is located on a water surface, part of the floating body of the floating body apparatus are located below the water surface. The obstacle may be a step, a slope, a hose line, or the like. When a hose line exists on a water surface at a front end in a movement direction of the floating body 1, part of the hose line sinks to the water surface may be effectively detected by using the detection sensor 2. The floating body 1 performs avoidance action to avoid the hose line.

The detection sensor 2 is arranged at a bottom of a side surface of the floating body 1, such that after entering water, the detection sensor 2 is lower than the water surface. A vertical distance H between the detection sensor 2 and the water surface satisfies 0<H≤15 cm, and specifically, 0<H≤13 cm. An angle β between a central reference axis of the detection sensor 2 and a vertical plane satisfies 0≤β≤90°. In the embodiment, the detection sensor is an ultrasonic detection sensor. An angle β between a central reference axis of a beam of the ultrasonic detection sensor and the vertical plane satisfies 0≤β≤90°. A detection range angle β of the detection sensor 2 being 90° is an optimal selection, such that the detection sensor 2 can effectively detect an underwater environment.

In air, attenuation of an ultrasonic wave is larger, a propagation distance is limited, and a propagation speed in air is approximately 343 m/s. However, in water, since density and acoustic resistance of water are higher, a propagation distance of an ultrasonic wave is longer, a signal is stabler, and a propagation speed of the ultrasonic wave in water is approximately 1500 m/s. In a case that the detection sensor 2 is mounted above the water surface, when the ultrasonic wave traverses the water surface, the ultrasonic wave is reflected and refracted, then a signal strength decreases or even a signal deviates, and detection accuracy and reliability are influenced. Accordingly, the detection sensor 2 is arranged at a position not higher than the water surface, the ultrasonic wave transmitted in the water has lower attenuation, a strength of an echo signal of the ultrasonic wave is higher, and a signal is clear, such that energy loss at an interface between the water and the air can be avoided, effective signal propagation is guaranteed, and an obstacle can be precisely located.

When the detection sensor 2 is located in the shallower water, an ultrasonic wave is reflected on the water surface, causing disturbance, and consequently, a level detection range and an effective coverage area are both reduced. When the detection sensor 2 is located in the deeper water, an ultrasonic wave is reflected on a water bottom, causing disturbance, the ultrasonic wave has larger attenuation, a signal strength is influenced, and detection accuracy of the detection sensor 2 is further influenced.

The vertical distance between the detection sensor 2 and the water surface is determined by detecting a signal parameter and an environment parameter of the detection sensor 2. The signal parameter and the environment parameter include at least one dimension or a combination of a plurality of dimensions of signal reflection disturbance, an effective signal strength, fluctuation disturbance, a fluctuation adaptability score, a level detection range, an effective coverage area, angle coverage, a coverage stability score, bubble disturbance, water splash disturbance, and an environment adaptability score.

As shown in Table 1 below, the above dimensions are specifically described. Signal reflection disturbance: a strength of disturbance of water surface fluctuation and reflection on a signal. Effective signal strength: a strength of a main signal received by the detection sensor 2. Signal attenuation: a strength of loss of a signal due to a propagation distance and a medium characteristic. Fluctuation disturbance: an influence (high/medium/low) of water surface fluctuation on a signal. Fluctuation adaptability score: a score of an adaptive capacity of the detection sensor 2 for the fluctuation disturbance, where the score of the adaptive capacity ranges from 1 to 5. Level detection range: an effective detection distance of the detection sensor 2 in a horizontal direction. Effective coverage area: an effective detection region area covered by the detection sensor 2. Angle coverage: a coverage angle of a beam in a horizontal plane. Coverage stability score: a score of stability of a beam angle range and a signal coverage region, where the score of the stability ranges from 1 to 5. Bubble disturbance: a degree of disturbance of underwater bubbles to a signal. Water splash disturbance: water-surface water splash disturbance caused by a water flow or movement of an apparatus. Environment adaptability score: a comprehensive adaptive capacity score on water bubbles, fluctuation, and other environmental disturbance, where the comprehensive adaptive capacity score ranges from 1 to 5.

turning right first and then turning left, so as to complete the avoidance action when the floating body 1 does not get entangled with the hose line. The preset distance may be set according to a length of the floating body 1. The preset distance may be 51 cm.

Figure 3:
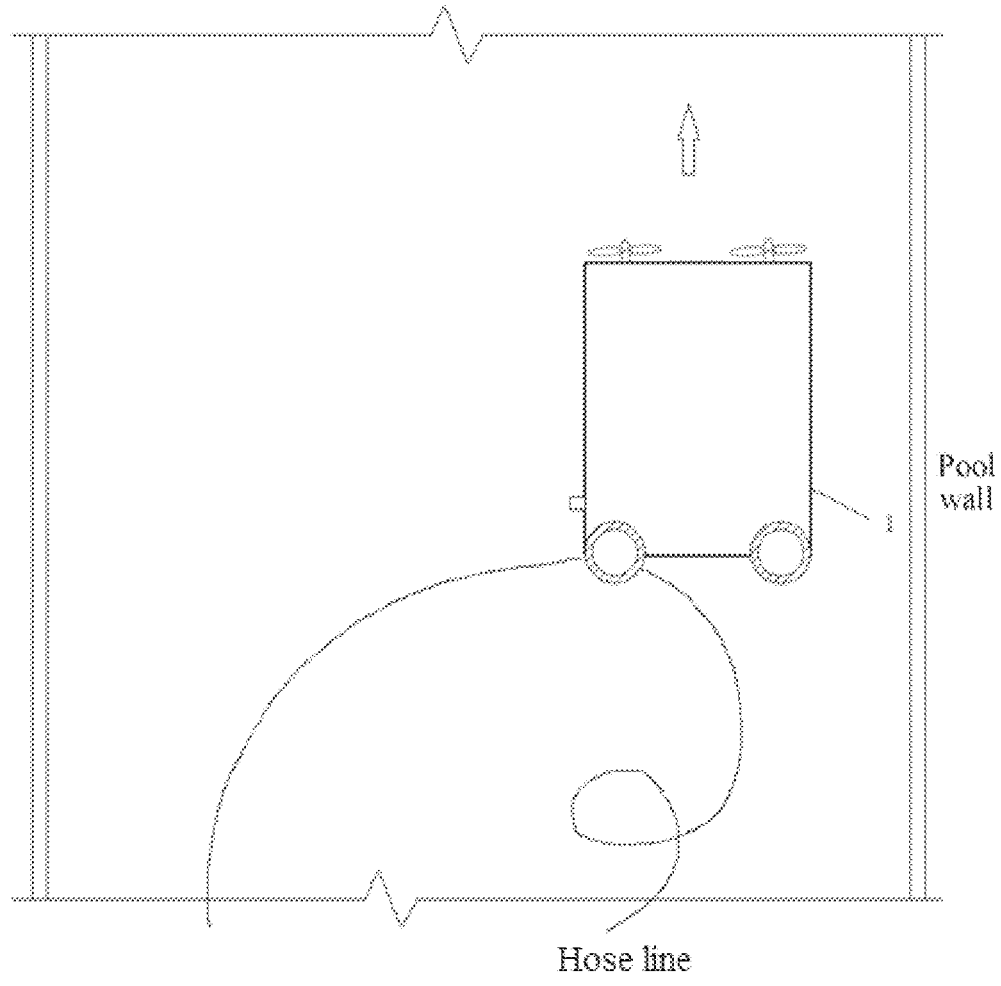
FIG. 3 is a schematic diagram of moving backwards when a right front corner of a floating body apparatus gets entangled with a hose line according to an embodiment of the disclosure.

In an embodiment, as shown in FIG. 3, when at least part of the hose line gets entangled with the floating body 1, the floating body 1 performs extrication action to get separated from the hose line. Specifically, when at least part of the hose line gets entangled with a right front corner of the floating body 1, and a distance between a left side of the floating body 1 and an obstacle is less than a first threshold,

TABLE 1

| Vertical distance (cm) | Signal reflection disturbance (%) | Effective signal strength (%) | Signal attenuation (%) | Fluctuation disturbance | Fluctuation adaptability score (1-5) | Level detection range (m) | Effective coverage area (m²) | Angle coverage (°) | Coverage stability score | Bubble disturbance (%) | Water splash disturbance (%) | Environment adaptability score (1-5) |
|---|---|---|---|---|---|---|---|---|---|---|---|---|
| 10 | 25 | 70 | 5 | High | 3 | 2.5 | 6.5 | 15 | 3 | 20 | 30 | 3 |
| 11 | 20 | 75 | 5 | Medium high | 4 | 2.8 | 7.8 | 18 | 4 | 15 | 25 | 4 |
| 12 | 15 | 80 | 5 | Medium | 4 | 3 | 9 | 20 | 4 | 10 | 15 | 4 |
| 13 | 10 | 85 | 5 | Medium | 5 | 3.2 | 10.2 | 20 | 5 | 5 | 10 | 5 |
| 14 | 12 | 82 | 6 | Medium low | 5 | 3 | 9.5 | 19 | 4 | 6 | 8 | 4 |
| 15 | 15 | 78 | 7 | Low | 5 | 2.8 | 8.2 | 17 | 3 | 10 | 5 | 4 |

It can be obviously obtained from Table 1 that an optimal selection of the vertical distance between the detection sensor 2 and the water surface is 13 cm. Compared with other parameters in Table 1, when the vertical distance is 13 cm, the signal reflection disturbance is 10%, which is lower, and the effective signal strength 85%, which is higher. An optimal balance between the signal reflection disturbance and the effective signal strength is reached. Secondly, the level detection range is 3.2 m, and the effective coverage area is 10.2 m². Both the level detection range and the effective coverage area reach maximum values. Finally, the fluctuation disturbance adaptability score and the environment adaptability score reach a maximum value of 5.

The vertical distance between the detection sensor 2 and the water surface is determined by using at least one dimension or a combination of a plurality of dimensions of the effective signal strength, the fluctuation adaptability, the level detection range, the angle coverage, and the environment adaptability, such that the detection sensor 2 can be adaptively set from a plurality of key dimensions, and has high detection efficiency. Further, the floating body apparatus can avoid an obstacle such as a hose line in time and avoid sticking in the obstacle.

In an embodiment, as shown in FIG. 2, when the hose line exists on the water surface at the front end of the movement direction of the floating body 1, the avoidance action performed by the floating body 1 includes at least one of or any combination of moving backwards, turning left, or turning right.

When the hose line exists on the water surface at the front end in the movement direction of the floating body 1, a distance between the floating body 1 and the hose line can be obtained by using the detection sensor 2. When the distance between the floating body 1 and the hose line reaches a preset distance, the floating body 1 may perform action of moving backwards, turning left, turning right, moving backwards and turning left, moving backwards and turning right, turning left first and then turning right, and the floating body 1 moves backwards until no part of the floating body makes contact with the hose line. In this case, a distance between the left side of the floating body 1 and the obstacle is short. If the floating body 1 continues getting close to the obstacle, the floating body possibly runs aground.

Figure 4:
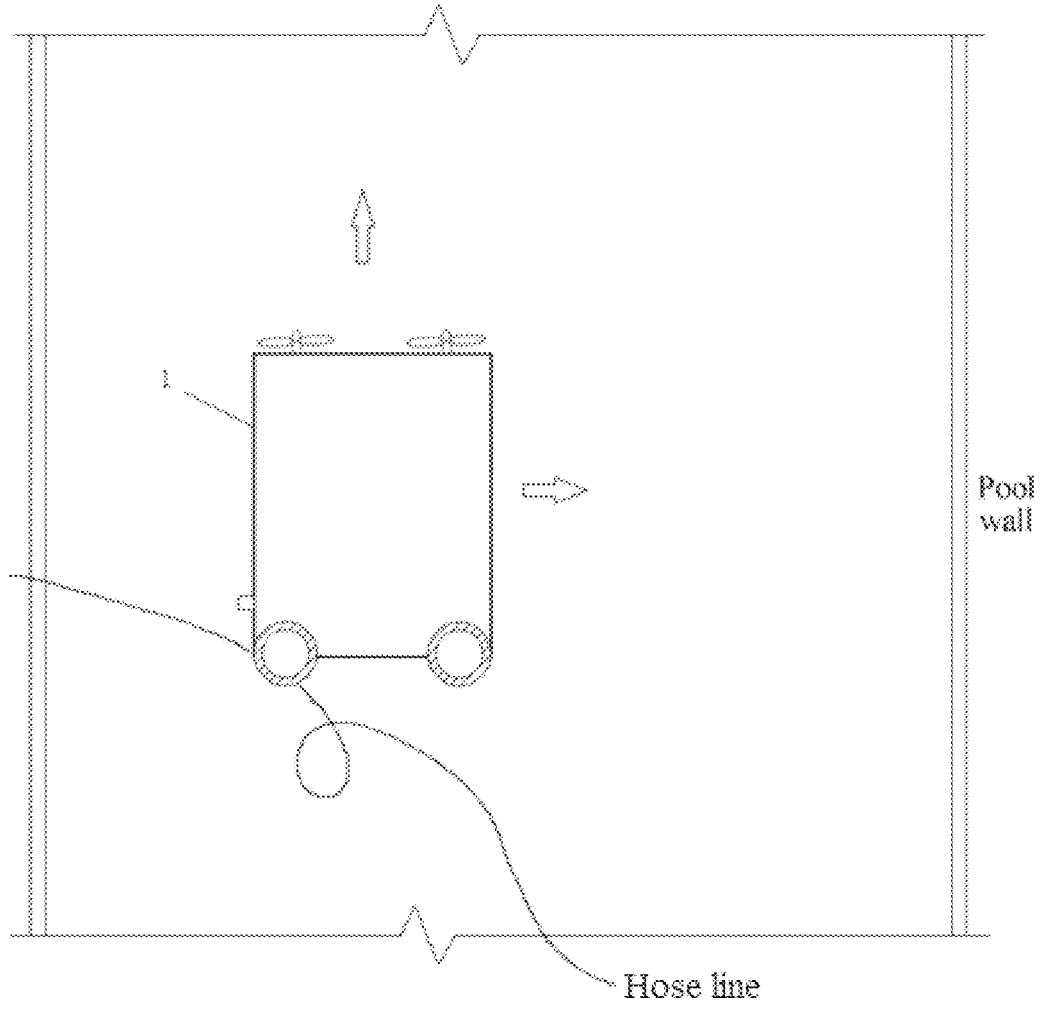
FIG. 4 is a schematic diagram of turning left or moving backwards when a right front corner of a floating body apparatus gets entangled with a hose line according to an embodiment of the disclosure.

As shown in FIG. 4, when at least part of the hose line gets entangled with a right front corner of the floating body 1, and a distance between a left side of the floating body 1 and an obstacle is not less than a first threshold, the floating body 1 turns left until no part of the floating body makes contact with the hose line.

Figure 5:
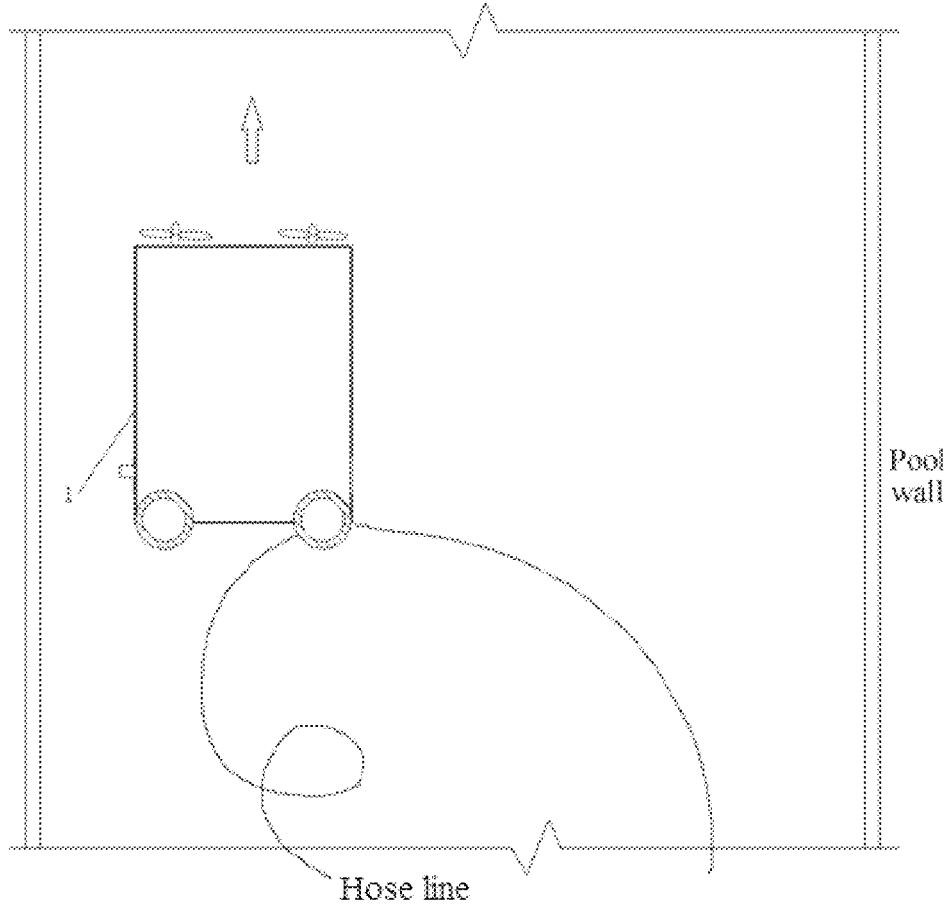
FIG. 5 is a schematic diagram of moving backwards when a left front corner of a floating body apparatus gets entangled with a hose line according to an embodiment of the disclosure.

As shown in FIG. 5, when at least part of the hose line gets entangled with a left front corner of the floating body 1, and a distance between a left side of the floating body 1 and an obstacle is less than a second threshold, the floating body 1 moves backwards until no part of the floating body makes contact with the hose line. In this case, a distance between the right side of the floating body 1 and the obstacle is shorter. If the floating body 1 continues getting close to the obstacle, the floating body possibly runs aground.

Figure 6:
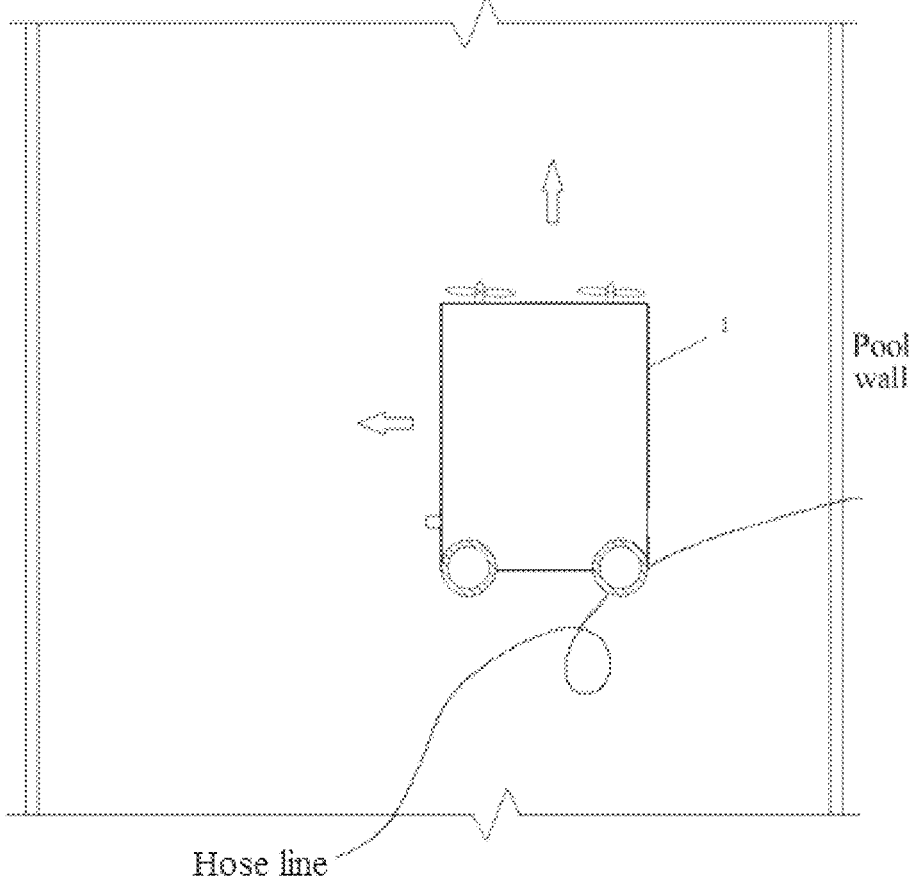
FIG. 6 is a schematic diagram of turning right or moving backwards when a left front corner of a floating body apparatus gets entangled with a hose line according to an embodiment of the disclosure.

As shown in FIG. 6, when at least part of the hose line gets entangled with a left front corner of the floating body 1, and a distance between a left side of the floating body 1 and an obstacle is not less than a second threshold, the floating body 1 turns right until no part of the floating body makes contact with the hose line.

The first threshold may be equal to the second threshold, and may be set according to the length of the floating body 1. When the distance between the floating body 1 and the obstacle is not less than the length of the floating body 1, the floating body 1 can freely turn around. The first threshold and the second threshold may be 51 cm. a distance being not less than the first threshold or not less than the second threshold is a safe distance between the floating body 1 and the obstacle. When the floating body 1 keeps a safe distance from the obstacle, the floating body 1 can move at the safe distance by being controlled to turn left or turn right to be extricated from the hose line. However, when the floating body 1 is close to the obstacle and cannot turn around, the floating body is likely to run aground. In this case, the floating body 1 may be controlled to move backwards to be extricated from the hose line. An extrication manner that the floating body 1 may select is flexible to allow the floating body to be effectively and quickly extricated from the hose line.

In an embodiment, the power system includes a left propeller and a right propeller. Both the left propeller and the right propeller are mounted at a rear of the floating body 1.

When the extrication action performed by the floating body 1 is moving backwards, both the left propeller and the right propeller are controlled to rotate reversely, such that the floating body 1 performs action of moving backwards. It may be understood that the left propeller and the right propeller both rotate forwards. The floating body 1 performs the action of moving forwards, that is, the floating body 1 moves to the front of the orientation of the floating body. The action of moving backwards is that the floating body 1 moves to the rear of the orientation of the floating body. The floating body 1 is controlled to move backwards to be effectively extricated from the hose line at the left front corner and/or the right front corner of the floating body 1 and move away from the hose line.

When the extrication action performed by the floating body 1 is turning left, a rotational speed of the left propeller is controlled to be less than that of the right propeller, such that the floating body 1 performs action of turning left. The different rotational speeds of the left propeller and the right propeller are controlled, and the left side of the floating body 1 is at a safe distance from the obstacle, such that the floating body 1 can turn around to be effectively extricated from the hose line at the right front corner of the floating body 1 and move away from the hose line.

When the extrication action performed by the floating body 1 is turning right, the rotational speed of the left propeller is controlled to be greater than that of the right propeller, such that the floating body 1 performs action of turning right. The different rotational speeds of the left propeller and the right propeller are controlled, and the right side of the floating body 1 is at a safe distance from the obstacle, such that the floating body 1 can turn around to be effectively extricated from the hose line at the left front corner of the floating body 1 and move away from the hose line.

By controlling the floating body 1 to perform the avoidance action or the extrication action, the floating body 1 may move backwards, turn left, turn right, and the like, and then the floating body 1 moves away from the hose line on the water surface, such that the high-efficient and rapid avoidance action and extrication action are implemented, and overall working efficiency and operational reliability of the floating body apparatus are improved.

In an embodiment, a floating body system is provided. The floating body system includes a detection unit, a power system, a control unit, and the floating body 1 in the above embodiment. The detection unit is used for detecting information of an obstacle around the floating body 1. The control unit controls, according to the information of an obstacle, the power system to perform avoidance action or extrication action. The floating body system has advantages of the above floating body apparatus, which are not repeated herein.

Units or systems in a floating body system may be completely or partially implemented by software, hardware, or their combination. Each unit described above may be embedded in or independent of a processor in a computer device in a form of hardware, or stored in a memory in the computer device in a form of software, so that the processor calls and executes an operation corresponding to each unit described above.

In the description of the disclosure, it should be understood that an orientation or position relationship indicated by terms such as "front", "rear", "left", "right", "left front corner", "right front corner", "bottom", and "side" is based on an orientation or position relationship of the floating body. The above definitions are merely used for explaining and describing the disclosure, and therefore cannot be understood as a limitation to the disclosure.

Technical features of the foregoing embodiments may be randomly combined. To make description concise, not all possible combinations of the technical features in the foregoing embodiments are described. However, the combinations of these technical features should be considered as falling within the scope recorded by this specification if no conflict exists.

The foregoing embodiments only describe several implementations of this application, which are described specifically and in detail, but cannot be construed as a limitation to the patent scope of this application. It should be noted that for a person of ordinary skill in the art, several transformations and improvements can be made without departing from the idea of this application. These transformations and improvements belong to the protection scope of this application. Therefore, the protection scope of the patent of this application should be subject to the appended claims.

The invention claimed is:

1. A floating body apparatus, comprising: a floating body and a detection sensor, wherein the detection sensor is an ultrasonic detection sensor, and the detection sensor is used for detecting information of an obstacle around the floating body, the detection sensor is arranged at a bottom or a side surface of the floating body, lower than a water surface, a vertical distance H between the detection sensor and the water surface satisfies $0<H\le13$ cm to reduce a disturbance of a ultrasonic reflection on the detection sensor, an angle $\beta$ between a central reference axis of the detection sensor and a vertical plane satisfies $0\le\beta\le90°$, and when a hose line exists on the water surface at a front end of a movement direction of the floating body, the floating body performs an avoidance action to avoid the hose line;

the vertical distance H is determined by detecting a signal parameter and an environment parameter of the detection sensor, and the signal parameter and the environment parameter are based on: signal reflection disturbance, an effective signal strength, fluctuation disturbance, a fluctuation adaptability score, a level detection range, an effective coverage area, angle coverage, a coverage stability score, bubble disturbance, water splash disturbance, and an environment adaptability score.

2. The floating body apparatus according to claim 1, wherein when the hose line exists on the water surface at the front end of the movement direction of the floating body, the avoidance action performed by the floating body comprises at least one of or any combination of moving backwards, turning left, or turning right.

3. A floating body system, comprising: a detection unit, a power system, a control unit, and the floating body apparatus according to claim 1, wherein the detection unit comprises the detection sensor, and the control unit controls, according to the information of an obstacle, the power system to perform avoidance action or extrication action.

4. The floating body apparatus according to claim 1, wherein when at least part of the hose line gets entangled with the floating body, the floating body performs extrication action to get separated from the hose line.

5. The floating body apparatus according to claim 4, wherein when at least part of the hose line gets entangled with a right front corner of the floating body, and a distance between a left side of the floating body and an obstacle is less than a first threshold, the floating body moves backwards until no part of the floating body makes contact with the hose line.

6. The floating body apparatus according to claim 4, wherein when at least part of the hose line gets entangled with a right front corner of the floating body, and a distance between a left side of the floating body and an obstacle is not less than a first threshold, the floating body turns left until no part of the floating body makes contact with the hose line.

7. The floating body apparatus according to claim 4, wherein when at least part of the hose line gets entangled with a left front corner of the floating body, and a distance between a left side of the floating body and an obstacle is less than a second threshold, the floating body moves backwards until no part of the floating body makes contact with the hose line.

8. The floating body apparatus according to claim 4, wherein when at least part of the hose line gets entangled with a left front corner of the floating body, and a distance between a left side of the floating body and an obstacle is not less than a second threshold, the floating body turns right until no part of the floating body makes contact with the hose line.

9. The floating body apparatus according to claim 4, further comprising a power system, wherein the power system comprises a left propeller and a right propeller, and both the left propeller and the right propeller are mounted at a rear of the floating body;

when the extrication action performed by the floating body is moving backwards, both the left propeller and the right propeller are controlled to rotate reversely, such that the floating body performs action of moving backwards;

when the extrication action performed by the floating body is turning left, a rotational speed of the left propeller is controlled to be less than that of the right propeller, such that the floating body performs action of turning left; and when the extrication action performed by the floating body is turning right, the rotational speed of the left propeller is controlled to be greater than that of the right propeller, such that the floating body performs action of turning right.

10. A floating body system, comprising: a detection unit, a power system, a control unit, and the floating body apparatus according to claim 4, wherein the detection unit comprises the detection sensor, and the control unit controls, according to the information of an obstacle, the power system to perform avoidance action or extrication action.

11. The floating body system according to claim 3, wherein when at least part of the hose line gets entangled with a right front corner of the floating body, and a distance between a left side of the floating body and an obstacle is less than a first threshold, the floating body moves backwards until no part of the floating body makes contact with the hose line; and/or when at least part of the hose line gets entangled with a right front corner of the floating body, and a distance between a left side of the floating body and an obstacle is not less than a first threshold, the floating body turns left until no part of the floating body makes contact with the hose line.

12. The floating body system according to claim 3, wherein when at least part of the hose line gets entangled with a left front corner of the floating body, and a distance between a left side of the floating body and an obstacle is less than a second threshold, the floating body moves backwards until no part of the floating body makes contact with the hose line; and/or when at least part of the hose line gets entangled with a left front corner of the floating body, and a distance between a left side of the floating body and an obstacle is not less than a second threshold, the floating body turns right until no part of the floating body makes contact with the hose line.

13. The floating body system according to claim 10, wherein when at least part of the hose line gets entangled with a right front corner of the floating body, and a distance between a left side of the floating body and an obstacle is less than a first threshold, the floating body moves backwards until no part of the floating body makes contact with the hose line; and/or when at least part of the hose line gets entangled with a right front corner of the floating body, and a distance between a left side of the floating body and an obstacle is not less than a first threshold, the floating body turns left until no part of the floating body makes contact with the hose line.

14. The floating body system according to claim 10, wherein when at least part of the hose line gets entangled with a left front corner of the floating body, and a distance between a left side of the floating body and an obstacle is less than a second threshold, the floating body moves backwards until no part of the floating body makes contact with the hose line; and/or when at least part of the hose line gets entangled with a left front corner of the floating body, and a distance between a left side of the floating body and an obstacle is not less than a second threshold, the floating body turns right until no part of the floating body makes contact with the hose line.

15. A floating body apparatus, comprising: a floating body and a detection sensor, wherein the floating body is able to be configured to float and operate on a water surface, and when the floating body floats and operates on the water surface, the detection sensor is located lower than the water surface, a vertical distance H between the detection sensor and the water surface satisfies $0 < H \leq 13$ cm; and when the detection sensor detects a hose line existing on the water surface at a front end of a movement direction of the floating body, the floating body performs an avoidance action to avoid the hose line, wherein the vertical distance H is determined by detecting a signal parameter and an environment parameter of the detection sensor, and the signal parameter and the environment parameter are based on: signal reflection disturbance, an effective signal strength, fluctuation disturbance, a fluctuation adaptability score, a level detection range, an effective coverage area, angle coverage, a coverage stability score, bubble disturbance, water splash disturbance, and an environment adaptability score.

16. The floating body apparatus according to claim 15, wherein when the hose line exists on the water surface at the front end of the movement direction of the floating body, the avoidance action performed by the floating body comprises at least one of or any combination of moving backwards, turning left, or turning right; and/or when at least part of the hose line gets entangled with the floating body, the floating body performs extrication action to get separated from the hose line.

17. The floating body apparatus according to claim 16, wherein when at least part of the hose line gets entangled with a right front corner of the floating body, and a distance between a left side of the floating body and an obstacle is less than a first threshold, the floating body moves backwards until no part of the floating body makes contact with the hose line; and/or when at least part of the hose line gets entangled with a right front corner of the floating body, and a distance between a left side of the floating body and an obstacle is not less than a first threshold, the floating body turns left until no part of the floating body makes contact with the hose line; and/or when at least part of the hose line gets entangled with a left front corner of the floating body, and a distance between a left side of the floating body and an obstacle is less than a second threshold, the floating body moves backwards until no part of the floating body makes contact with the hose line; and/or when at least part of the hose line gets entangled with a left front corner of the floating body, and a distance between a left side of the floating body and an obstacle is not less than a second threshold, the floating body turns right until no part of the floating body makes contact with the hose line.

18. A floating body apparatus, comprising: a floating body and a detection sensor, wherein the detection sensor is an ultrasonic detection sensor, and the floating body is able to be configured to float and operate on a water surface; when the floating body floats and operates on the water surface, the detection sensor is located lower than the water surface, and is used for detecting a host line on the water surface, a vertical distance H between the detection sensor and the water surface satisfies 0<H≤13 cm, and the vertical shortly H is configured to balance a water surface reflection disturbance and a water bottom reflection disturbance, and optimize a detection signal of the detection sensor for the host line; and when the detection sensor detects the hose line existing on the water surface, the floating body performs an avoidance action to avoid the hose line, wherein the vertical distance H is determined by detecting a signal parameter and an environment parameter of the detection sensor, and the signal parameter and the environment parameter are based on: signal reflection disturbance, an effective signal strength, fluctuation disturbance, a fluctuation adaptability score, a level detection range, an effective coverage area, angle coverage, a coverage stability score, bubble disturbance, water splash disturbance, and an environment adaptability score.

19. The floating body apparatus according to claim 18, wherein when the hose line exists on the water surface at the front end of the movement direction of the floating body, the avoidance action performed by the floating body comprises at least one of or any combination of moving backwards, turning left, or turning right; and/or when at least part of the hose line gets entangled with the floating body, the floating body performs extrication action to get separated from the hose line.

20. The floating body apparatus according to claim 19, wherein when at least part of the hose line gets entangled with a right front corner of the floating body, and a distance between a left side of the floating body and an obstacle is less than a first threshold, the floating body moves backwards until no part of the floating body makes contact with the hose line; and/or when at least part of the hose line gets entangled with a right front corner of the floating body, and a distance between a left side of the floating body and an obstacle is not less than a first threshold, the floating body turns left until no part of the floating body makes contact with the hose line; and/or when at least part of the hose line gets entangled with a left front corner of the floating body, and a distance between a left side of the floating body and an obstacle is less than a second threshold, the floating body moves backwards until no part of the floating body makes contact with the hose line; and/or when at least part of the hose line gets entangled with a left front corner of the floating body, and a distance between a left side of the floating body and an obstacle is not less than a second threshold, the floating body turns right until no part of the floating body makes contact with the hose line.

* * * * *